United States Patent [19]

Kurosu et al.

[11] Patent Number: 5,625,810
[45] Date of Patent: Apr. 29, 1997

[54] DATA FILE APPARATUS FOR REGISTERING AND RETRIEVING DATA FILES IN ACCORDANCE WITH ATTRIBUTE INFORMATION THEREOF

[75] Inventors: Yasuo Kurosu, Yokosuka; Yoshihiro Yokoyama, Yokohama; Hidefumi Masuzaki, Hadano, all of Japan

[73] Assignee: Hitachi, Ltd., Tokyo, Japan

[21] Appl. No.: 246,725

[22] Filed: May 20, 1994

[30] Foreign Application Priority Data

May 21, 1993 [JP] Japan .................... 5-120006

[51] Int. Cl.$^6$ .................... G06F 17/30
[52] U.S. Cl. .................... 395/601; 364/DIG. 1; 364/282.1; 364/237.2; 364/286.2; 395/348
[58] Field of Search .................... 395/145, 159, 395/600, 147; 364/DIG. 1

[56] References Cited

U.S. PATENT DOCUMENTS

| | | | |
|---|---|---|---|
| 5,027,421 | 6/1991 | Kanno | 382/47 |
| 5,257,349 | 10/1993 | Alexander | 395/159 |
| 5,315,697 | 5/1994 | Nagamatsu | 395/155 |
| 5,321,831 | 6/1994 | Hirose | 395/600 |
| 5,335,084 | 8/1994 | Munemasa et al. | 358/403 |
| 5,339,409 | 8/1994 | Sakuragi | 395/600 |
| 5,353,397 | 10/1994 | Yokoyama et al. | 395/145 |
| 5,365,360 | 11/1994 | Torres | 395/159 |
| 5,367,672 | 11/1994 | Takagi | 395/600 |
| 5,369,742 | 11/1994 | Kurosu et al. | 395/147 |

*Primary Examiner*—Thomas G. Black
*Assistant Examiner*—Jean R. Homere
*Attorney, Agent, or Firm*—Antonelli, Terry, Stout & Kraus, LLP

[57] ABSTRACT

The present invention is a data file apparatus in which input data files are assigned attribute information which is a clue to retrieval of the data files. Each data file is assigned an appropriate symbol to be displayed when assignment of a symbol as attribute information for the desired first data file displayed in the display means is selected, and each data file is assigned a keyword for when assignment of a keyword as attribute information for the desired second data file is selected. Accordingly data files may be easily registered and retrieved in accordance with attribute information thereof as either symbols or keywords.

13 Claims, 7 Drawing Sheets

DATA FILE APPARATUS FOR REGISTERING AND RETRIEVING DATA FILES IN ACCORDANCE WITH ATTRIBUTE INFORMATION THEREOF

BACKGROUND OF THE INVENTION

The present invention relates to a data file apparatus which can register and retrieve data easily regardless of the number of registered files.

Recently, image filing devices have appeared as a fourth office automation (OA) device following word processors, personal computers, and facsimiles and have received much attention as a means for promoting paperless processing in office work and design.

An image filing device stores image information using an optical disk and it can be read and printed immediately whenever necessary.

Therefore, image filing devices are widely spread into fields where particularly a large amount of documents are generated, and high efficiency in retrieval for fetching a desired document from stored documents is one of the important problems concerned with image filing devices.

Therefore, to realize effective retrieval, a method using keywords is widely used. In the method, to register image data, a word indicating the content of the image is added as a keyword. To retrieve the data, the same keyword is input from the keyboard so as to find the desired image. As a method for assigning the keyword, a method for assigning important words and phrases representing concepts of images is generally used. For example, keywords of machine drawings are a product name, drawing number, revision, and designer name.

However, the method using keywords are troublesome because it is necessary to input keywords from the keyboard. For example, to input five keywords 10 characters long, it is necessary to touch more than 100 keys. Retrieval also requires troublesome keyword input.

Therefore, this large amount of work, that is, operational inefficiency is one of causes of disturbing wide use of image filing devices.

An art for eliminating such defects is indicated, for example, in Japanese Patent Application Laid-Open No. 1-232769. According to this prior art, a plurality of heading images are displayed on the screen instead of keywords to be registered and the labor of inputting keywords is saved. Namely, heading images indicating document types are prepared beforehand and displayed on the display when an image file is registered. The heading image corresponding to the image file to be registered is designated by a mouse. By doing this, the heading image is registered in place of the keyword.

As mentioned above, the heading image can be registered only by designating it by the mouse in place of inputting the keyword from the keyboard and there is no need to input a keyword from the keyboard every time for registration. For retrieval, by displaying a plurality of heading images in the same way and designating the heading image corresponding to the desired image file by the mouse, the desired image can be read from the optical disk. Such a retrieval method of list display selection is effective in reducing the psychological burden of an operator compared with the keyword input method.

However, according to the above prior art, as the number of stored images of image data increases, the list display extends across a plurality of screens. As a result, a problem that the display processing for retrieval requires a lot of time is imposed. For example, when 20 heading images are displayed on one screen, up to 20 documents can be registered and retrieved easily, though 40 documents require a double time.

Therefore, there is a problem imposed that as the number of images to be registered increases, it is necessary to turn several display screens and the resulting operation is troublesome. Although an optical disk which is used as a storage medium can store 20,000 to 200,000 images, there is a problem imposed that as the number of images for storing image data increases, the retrieval becomes difficult and finally actual retrieval becomes impossible.

SUMMARY OF THE INVENTION

An object of the present invention is to provide a data file apparatus having satisfactory operability in registration and retrieval of data files regardless of the number of data files so as to solve the above problems.

To accomplish the above object, the present invention is a data file apparatus having data file input means for inputting a plurality of data files, such as image data files, data file storage means for storing the plurality of data files, such as image data files input by the above data input means by assigning attribute information which is a clue to retrieval of the data files, symbol storage means for storing symbols, display means for displaying data files input by the above data file input means and for reading and displaying symbols stored in the above symbol storage means, designation means for designating an appropriate symbol displayed in the above display means, keyword input means for inputting keywords, and attribute information assignment data file registration means for assigning, when assignment of a symbol as attribute information for the desired first data file displayed in the above display means is selected, the appropriate symbol designated by the above designation means to the above desired first data file as the above attribute information and for storing the symbol in the above data file storage means and, when assignment of a keyword as attribute information for the desired second data file displayed in the above display means is selected, for assigning the appropriate keyword input by the above keyword input means to the above desired second data file as the above attribute information and for storing the keyword in the above data file storage means.

According to the present invention, the above attribute information assignment data file registration means of the above data file apparatus has selection means for selecting one of the symbol and keyword as attribute information which is assigned to the data file input by the above data file input means. According to the present invention, the above attribute information assignment data file registration means of the above data file apparatus is structured so as to select one of the symbol and keyword as attribute information according to the data file status stored in the above data file storage means. According to the present invention, in the above attribute information assignment data file registration means of the above data file apparatus, the above data file status includes the number of data files. According to the present invention, the above attribute information assignment data file registration means of the above data file apparatus is structured so as to select one of the symbol and keyword as attribute information according to the symbol status stored in the above symbol storage means. According to the present invention, in the above attribute information assignment data file registration means of the above data file apparatus, the above symbol status includes the number of symbols. According to the present invention, the above attribute information assignment data file registration means of the above data file apparatus includes a CPU. According to the present invention, the above data file apparatus includes an optical disk means as said data file storage means. According to the present invention, the above data file apparatus includes mouse means as said designation means. According to the present invention, in the above data file apparatus, the above symbol is formed by an icon.

The present invention is a data file apparatus having data file input means for inputting data files such as image data files, data file storage means for storing data files such as image data files input by the above data file input means by assigning attribute information which is a clue to retrieval of the data files, symbol storage means for storing symbols beforehand, display means for reading and displaying symbols stored in the above symbol storage means, designation means for designating an appropriate symbol displayed in the above display means, keyword input means for inputting keywords, and attribute information assignment data file retrieval means for retrieving, when the symbol assigned to the desired first data file as attribute information is selected, the above desired first data file to which the appropriate symbol designated by the above designation means is assigned as the above attribute information from the above data file storage means and, when the keyword assigned to the desired second data file as attribute information is selected, for retrieving the above desired second data file to which the appropriate keyword input by the above keyword input means is assigned as the above attribute information from the above data file storage means.

According to the present invention, the above attribute information assignment data file retrieval means of the above data file apparatus has selection means for selecting one of the symbol and keyword as attribute information which is assigned to the data file retrieved from the above data file storage means. According to the present invention, the above attribute information assignment data file retrieval means of the above data file apparatus is structured so as to select one of the symbol and keyword as attribute information according to the data file status stored in the above data file storage means. According to the present invention, in the above attribute information assignment data file retrieval means of the above data file apparatus, the above data file status consists of the number of data files. According to the present invention, the above attribute information assignment data file retrieval means of the above data file apparatus is structured so as to select one of the symbol and keyword as attribute information according to the symbol status stored in the above symbol storage means. According to the present invention, in the above attribute information assignment data file retrieval means of the above data file apparatus, the above symbol status includes the number of symbols. According to the present invention, the above attribute information assignment data file retrieval means of the above data file apparatus includes a CPU. According to the present invention, the above data file apparatus includes optical disk means as said data file storage means. According to the present invention, the above data file apparatus includes mouse means as said designation means. According to the present invention, in the above data file apparatus, the above symbol is formed by an icon. According to the present invention, in the above data file apparatus, the above data file storage means is structured so as to compress or code and store data such as image data.

Namely, the present invention is a data file apparatus for registering and retrieving data having data file storage means for corresponding a data file to attribute information which is a clue for retrieving the data file and storing it, display means for displaying data and symbols, symbol storage means for corresponding a symbol image to the coded data which is defined for the symbol and storing it, keyword input means, designation means for designating a symbol displayed in the above display means, data file input means for inputting a data file to be registered, symbol assignment data registration and retrieval means for registering the data file into which the symbol ID defined for the symbol designated by the above designation means is input as the above attribute information from the above data file input means into the above data file storage means and/or for retrieving the data file which is already stored in the above data file storage means, keyword assignment data file registration and retrieval means for registering the data file into which the keyword inputted by the above keyword input means is input as the above attribute information from the above data file input means into the above data file storage means and/or for retrieving the data file which is already stored in the above data file storage means, operation designation means for designating an operation, and selection means for selecting and starting one of the above symbol assignment data registration and retrieval means and the above keyword assignment data file registration and retrieval means when a registration or retrieval instruction is issued from the above operation designation means.

It is desirable that the present invention has file number detection means for detecting the number of data files registered in the above data file storage means, and the above selection means stores a predetermined reference number of documents, and when the number of files detected by the above file number detection means is smaller than the above reference number of documents, the present invention starts the above symbol assignment data registration and retrieval means, and when the number of files detected by the above file number detection means is larger than the above reference number of documents, the present invention starts the above keyword assignment data registration and retrieval means.

It is acceptable that the present invention has symbol number detection means for detecting the number of symbols stored in the above symbol storage means, and the above selection means stores a predetermined reference number of symbols, and when the number of symbols detected by the above symbol number detection means is smaller than the above reference number of symbols, the present invention starts the above symbol assignment data registration and retrieval means, and when the number of symbols detected by the above symbol number detection means is larger than the above reference number of symbols, the present invention starts the above keyword assignment data registration and retrieval means.

According to the above constitution, by selecting one of the symbol and keyword which are attribute information regardless of the number of documents (the number of data files) registered in the data file storage means such as an optical disk device, file data can be easily registered or retrieved into or from the data file storage means and the man-machine interface of the data file apparatus can be improved substantially.

DETAILED DESCRIPTION OF THE PREFERRED EMBODIMENT

Figure 1:
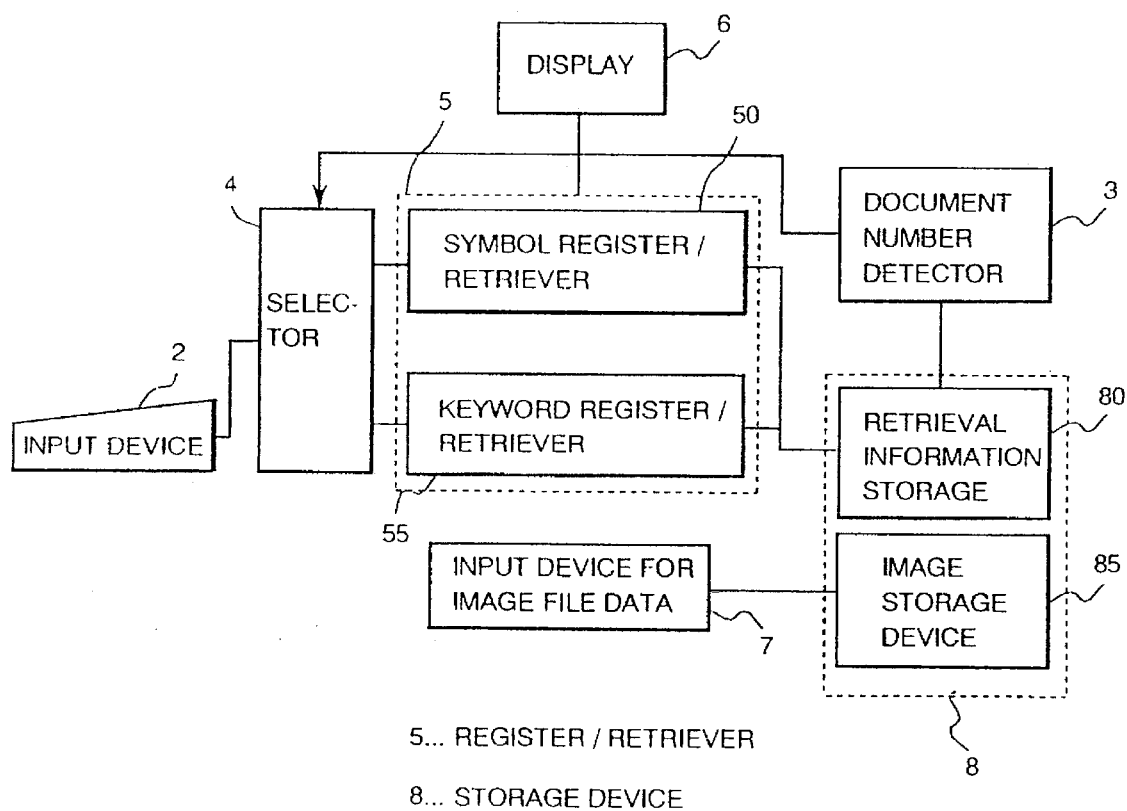
FIG. 1 is a function block diagram of an embodiment of the present invention.

An embodiment of the data file apparatus of the present invention will be explained with reference to the accompanying drawings hereunder. FIG. 1 is a drawing showing the entire constitution of an embodiment of an image file device relating to the data file apparatus of the present invention which is functionally represented. Namely, the image file device consists of an input device 2, a document number detector 3, a selector 4, a register/retriever 5, a display 6, an input device for image file data 7, and a storage device 8.

The input device 2 is used by a user of this image file device so as to select and designate the function of registration or retrieval, or select the symbol, or input the keyword. The document number detector 3 is used to detect the number of documents stored in the storage device 8. The selector 4 selects one of a symbol register/retriever 50 and a keyword register/retriever 55 so as to register or retrieve image file data. The above selector 4 stores a predetermined reference number of documents θ which is a reference of selection. The selector 4 compares the above reference number of documents θ with the number of documents detected by the above document number detector 3 and performs the above selection according to the magnitude between the numbers. This embodiment is structured so that the selector 4 selects and starts the symbol register/retriever 50 when the number of documents (number of image files) is smaller than the above reference number of documents θ and the keyword register/retriever 55 when the number of documents (number of image files) is larger than the above reference number of documents θ.

The register/retriever 5 is used to register or retrieve image file data. To register image file data, it is necessary to assign the attribute (800 shown in FIG. 3) which is a clue for retrieval to the image file data (or document) (850 shown in FIG. 3) beforehand. The register/retriever 5 in this embodiment has a symbol register/retriever 50 and a keyword register/retriever 55 for which the above attribute input method is different.

To register or retrieve image file data, the symbol register/retriever 50 inputs the attribute of the above image file data by designating a symbol. Namely, for registration, the symbol which is prepared already is displayed on the screen of the display 6 and the user designates the symbol. The information (for example, symbol ID (802 or 861 shown in FIG. 3), symbol keyword (863 shown in FIG. 3) which will be described later) which is associated with the designated symbol beforehand is stored as attribute information of the image file data. By doing this, image file data assigned with the same symbol is assigned with the same symbol keyword. On the other hand, for retrieval, the user can input the attribute information which is a clue for the target image file data by designating the symbol.

The "symbol" mentioned above is generally a pictorial symbol or icon and set by the user (or the system) beforehand. The present embodiment is structured so that a keyword can be set in correspondence with the symbol in this case (hereinafter, the keyword which is set in correspondence with the above symbol (symbol ID 861 and symbol image 862 in FIG. 3)). By doing this, even if the number of documents increases later and it becomes necessary to use the keyword register/retriever 55 as a result, the keyword register/retriever 55 can be operated as it is. Namely, for retrieval, the keyword register/retriever 55 searches for image file data (852 shown in FIG. 3) assigned with the symbol keyword which matches with the keyword inputted by the user. An input image which is cut down may be used as a symbol image which is displayed as a symbol.

For registration or retrieval of image file data, when the user inputs a keyword (803 shown in FIG. 3) using the input device 2, the keyword registration/retriever 55 inputs the attribute of the above image file data. Namely, for registration, the keyword registration/retriever 55 displays the keyword input screen on the screen of the display 6 and inputs the keyword from the input device 2. The keyword registration/retriever 55 associates the input keyword with the above image file data (852 shown in FIG. 3) as attribute information and stored it. On the other hand, also for retrieval, the keyword registration/retriever 55 inputs the attribute information necessary for retrieval by inputting the keyword. The keyword registration/retriever 55 searches for image file data assigned with the keyword (or symbol keyword) which matches with the attribute information (namely keyword) which is input at this time.

The display 6 displays a symbol or keyword input screen or images stored in the storage device according to an instruction from the register/retriever 5. The display 6 also has a function for displaying images input by the input device for image file data 7.

The input device for image file data 7 scans a document to be input (image file data) optically and converts it to image file data which is binary digital data.

The storage device 8 consists of a retrieval information storage device 80 and an image data storage device 85. The retrieval information storage device 80 is used to store identification numbers of registered documents (image file data) and attribute information, symbol IDs and keywords (or symbol keywords) which are attribute information assigned to the above documents and image file data, and furthermore link information (for example, pointers indicating addresses where the image file data (codes data) of the above documents are stored) with the image storage device 85. The image storage device 85 is used to store symbol image information (862 shown in FIG. 3) and image file data input from the input device for image file data 7.

Figure 3:
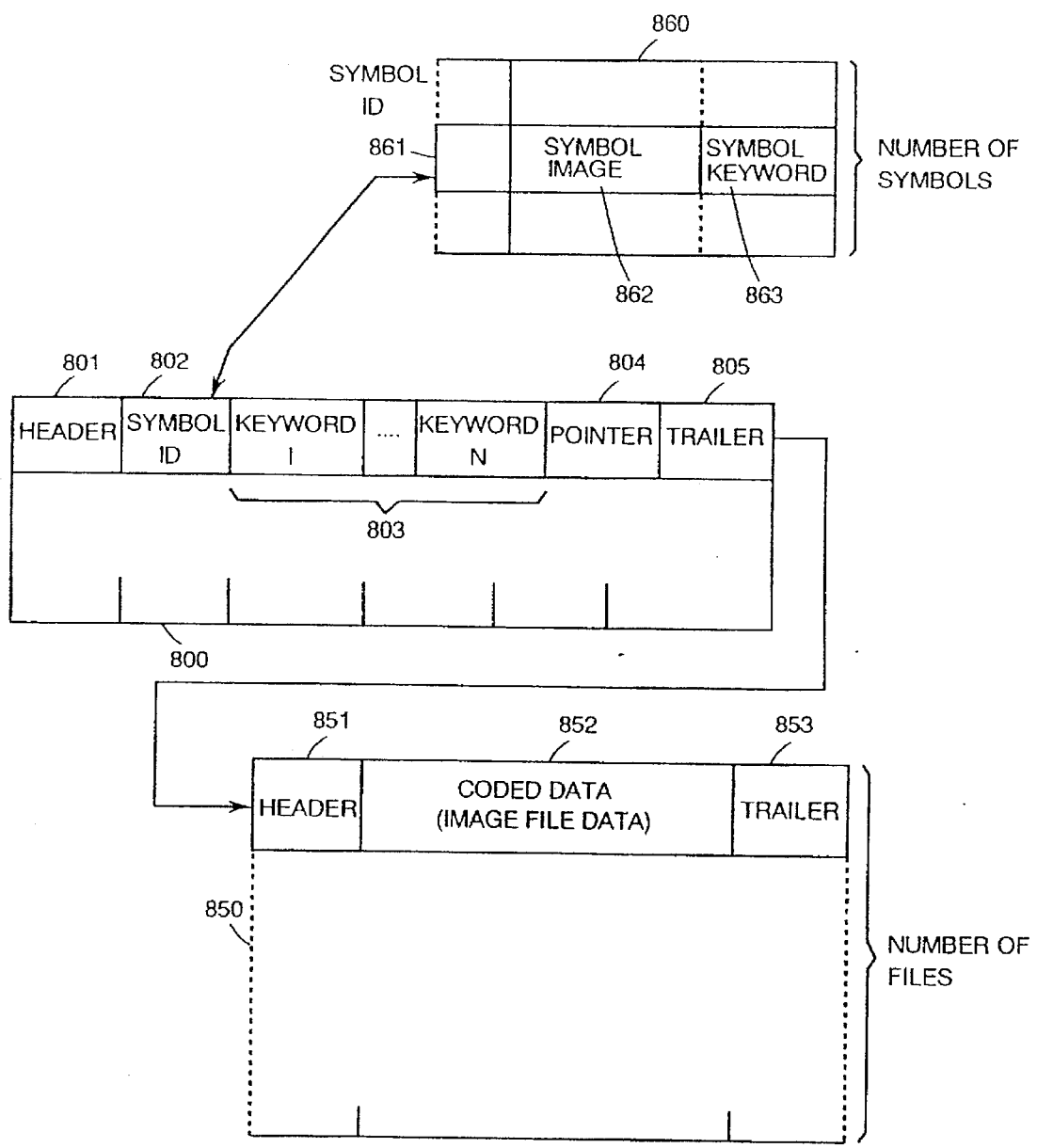
FIG. 3 is a drawing showing the data structure of this embodiment.

The structure of data stored in the storage device 8 will be explained. Data can be divided, as shown in FIG. 3, into three parts such as an index part 800 which is stored in the retrieval information storage device 80, an image file data part 850 which is stored in the image storage device 85, and a symbol part 860.

The index part 800 includes a header 801, a symbol ID 802, a keyword (or symbol keyword) 803, a pointer 804, and a trailer 805. The header 801 indicates the head of the index data. The symbol ID 802 and the keyword (or symbol keyword) 803 indicate attribute information which is a clue for retrieval of a document (image file data) corresponding to the index data. The pointer 804 indicates the position where the above document (image file data) is stored.

The image file data part 850 includes a header 851, image file data (coded data) 852, and a trailer 853.

The symbol part 860 includes a symbol ID 861, symbol image information 862 for indicating a symbol figure, and a symbol keyword 863.

The data structure explained above is just an example and the present invention is not limited to it.

Figure 2:
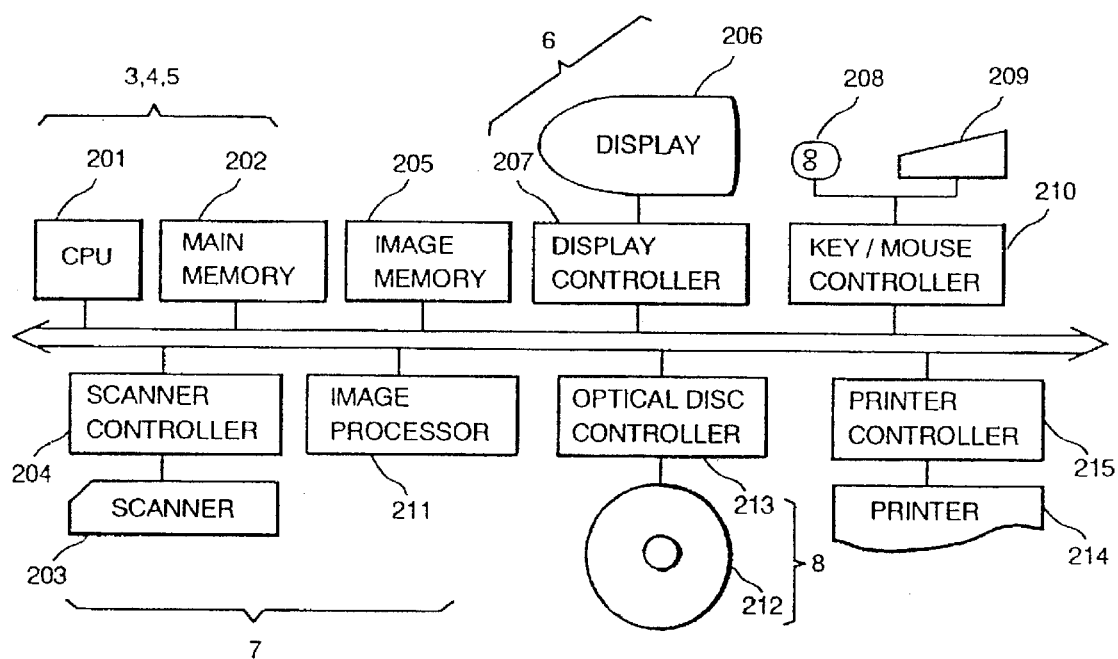
FIG. 2 is a block diagram of hardware.

Next, the hardware constitution of an image filing device which is an embodiment of the data file apparatus of the present invention will be explained with reference to FIG. 2. Namely, the image filing device includes a CPU (central processing unit) 201, a main memory 202, a scanner 203, a scanner controller 204, an image memory 205, a display 206, a display controller 207, a mouse 208, a keyboard 209, a key/mouse controller 210, an image processor 211, an optical disk device 212, an optical disk controller 213, a printer 214, and a printer controller 215.

The CPU 201 is used to control the entire apparatus. The main memory 202 stores a program for controlling the CPU 201 and tables. The document number detector 3, the selector 4, and the register/retriever 5 shown in FIG. 1 are realized mostly by executing the program in the main memory 202 by the CPU 201. Namely, the CPU 201 which executes the program in the main memory 202 includes the document number detector 3, the selector 4, and the register/retriever 5.

The scanner 203 converts the input document to electrical image data. The scanner controller 204 generates a drive signal or the scanner 203 and transfers image file data which is read by the scanner 203 to the image memory 205 and the image processor 211. The image memory 205 is a buffer for temporarily storing input image file data. The image processor 211 compresses or decodes image file data by enlarging or shortening, that is, coding image data. As image file data compression methods, for example, there are the MH (Modified Huffman) and MMR (Modified Modified READ) methods available.

The scanner 203, the scanner controller 204, the image memory 205, and the image processor 211 are equivalent to the input device for image file data 7 shown in FIG. 1.

The display 206 is used to show image file data and symbol image information. The display controller 207 is used to control display of image file data and symbol image information. The display 206 and the display controller 207 are equivalent to the display 6 shown in FIG. 1.

The mouse 208 is used to designate a symbol by inputting the coordinates on the screen. The keyboard 209 is used to input character codes of keywords. The key/mouse controller 210 is used to sample information from the mouse 108 and the keyboard 209 and the transfer it to the CPU 201. The mouse 208, the keyboard 209, and the key/mouse controller 210 are equivalent to the input device 2 shown in FIG. 1.

The optical disk device 212 stores image file data and retrieval information (index) using the optical disk 212 as a storage medium. The optical disk controller 213 is used to transfer data to the optical disk device 212. The optical disk device 212 and the optical disk controller 213 are equivalent to the storage device 8 shown in FIG. 1.

In the optical disk device 212, an image file data area 850 corresponding to the image file data storage device 85 and an index area 800 corresponding to the retrieval information storage device 80 are set beforehand.

The printer 214 is used to print image file data on a paper sheet. The printer controller 215 generates a drive signal for the printer 214 and sends the image file data to be printed to the printer 214. A device equivalent to the printer 214 and the printer controller 215 is not shown in FIG. 1. However, it is desirable to install such a device in an actual apparatus.

The hardware constitution is not limited to the above mentioned. When the devices mentioned above are all operated in close connection with each other, the function of each device can be fulfilled. The correspondence with FIG. 1 mentioned above is not required.

Next, the operation will be explained.

Figure 4:
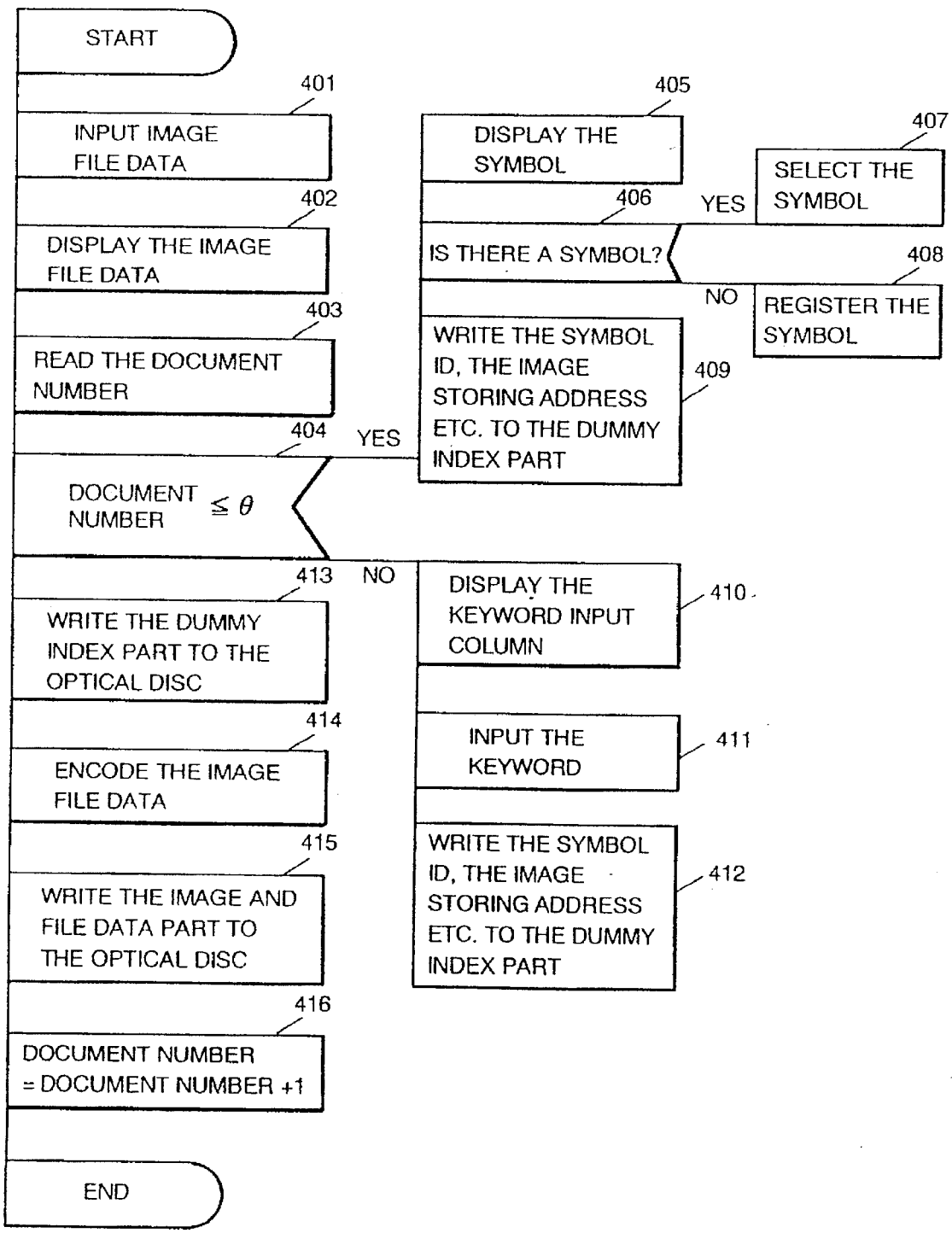
FIG. 4 is a flow chart showing an operation when a symbol is registered.
Figure 5:
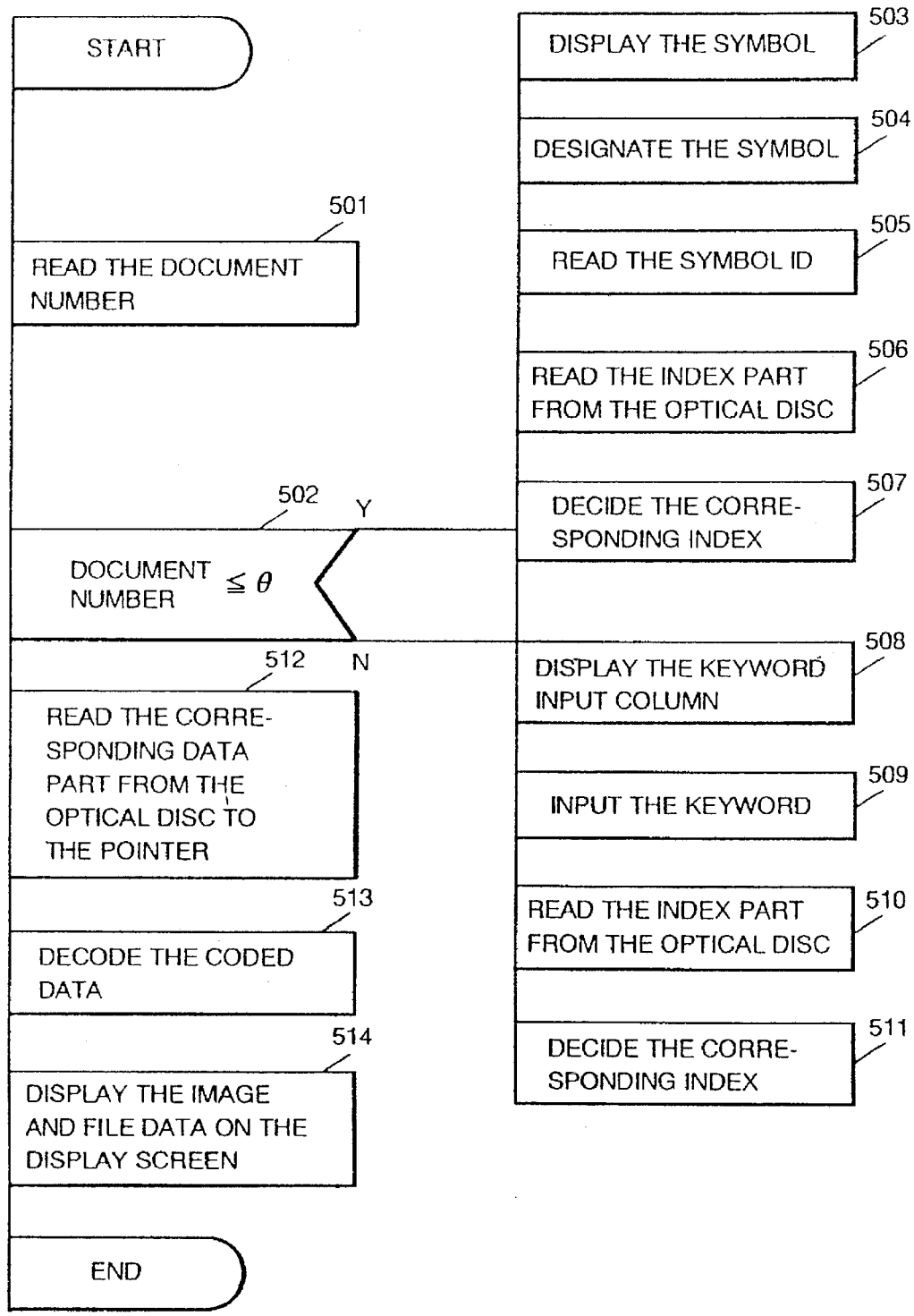
FIG. 5 is a flow chart showing an operation when a symbol is retrieved.

Firstly, the registration processing will be explained with reference to FIGS. 4, 6, and 7.

When the apparatus is started, the scanner controller 204 is started by the CPU 201 according to the program stored in the main memory 202. The started scanner controller 204 drives the scanner 203 and inputs image file data (Step 401). The input image file data is stored in the image memory 205 via the scanner controller 204.

The image file data stored in the image memory 205 is confirmed for registration by the operator on the display 207. Namely, the CPU 201 starts the image processor 211 and transfers the image file data stored in the image memory 205 to the display controller 207. The transferred image file data is displayed on the display 206 and confirmed (Step 402). After confirmation, the image file data is compressed, converted to binary coded data, and stored in the image file data part 850. The processing at Steps 401 and 402 may be performed after Step 404 which will be described later.

Next, the decide the method for registering the content of the index part 800, the number of documents (the number of image data files) stored in the optical disk 212 is decided.

Namely, the CPU 201 reads the number of registered documents which is written in the main memory 202 beforehand and registered in the optical disk 212 (Step 403) and compares it with the predetermined reference number of documents θ (Step 404). When the number of documents is smaller than the reference number of documents θ, the CPU goes to Steps 405 to 409 which will be described later and executes the registration mode using symbols. When the number of documents is larger than the reference number of documents θ, the CPU goes to Steps 410 to 412 which will be described later and executes the registration mode using keywords.

In the registration mode using symbols, the CPU 201 reads the symbols registered in the main memory 202 and displays them on the display 206 via the display controller 207 (Step 405). The operator confirms whether a suitable one is contained or not in the displayed symbols by turning the pages on the display screen (Step 406). When a suitable symbol is found, the operator designates the necessary symbol on the screen using the mouse 208 (Step 407, see the symbol registration sequence (2) shown in FIG. 6). When no suitable symbol is found, the operator registers a new symbol (Step 408). A new symbol to be registered is drawn by the operator on the screen using the mouse 8.

The information of the selected or newly registered symbol is stored in the main memory 202 from the mouse 208 via the key/mouse controller 210. The CPU 201 decodes the corresponding symbol ID from the symbol information stored in the main memory 202. The CPU 201 writes the ID (index) in the dummy index part of the main memory 202 (Step 409). Information which is written into the dummy index part is the storing address, size, lateral width, longitudinal length, and registration date of image file data onto the optical disk 212 in addition to the symbol ID.

Figure 7:
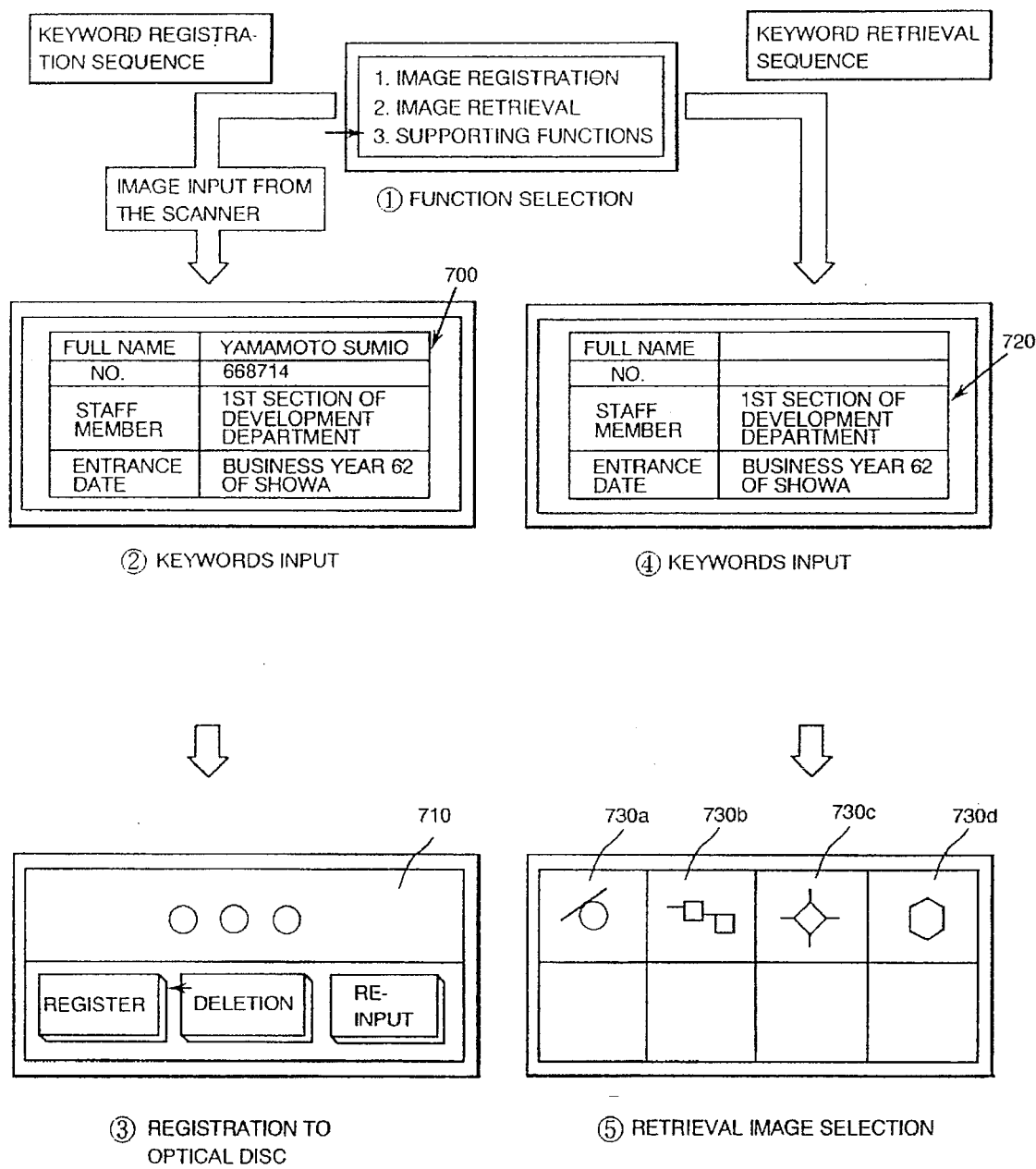
FIG. 7 is a drawing showing the status of changes in screen display when a keyword is registered and retrieved when there are few documents registered.

On the other hand, in the keyword registration processing, the CPU displays the keyword input column (Step 410) and the operator inputs the keyword from the keyboard 209 (Step 411, see the keyword registration sequence (2) shown in FIG. 7). The input keyword is stored in the dummy index part of the main memory 202 via the key/mouse controller 210. Information which is written into the dummy index part is the storing address, size, lateral width, longitudinal length, and registration date of image file data onto the optical disk 212 in addition to the keyword.

After Steps 409 and 412, the CPU goes to Step 413. At Step 413, the CPU 201 reads the information stored in the dummy index part from the main memory 202 by a registration instruction from the operator (see the symbol registration sequence (3) shown in FIG. 6, see the keyword registration sequence (3) shown in FIG. 7) and registers it in the index part 800 of the index area of the optical disk 212. To write the symbol ID, the CPU acquires the symbol keyword in which the symbol is defined with reference to the symbol part 860 and also writes the symbol keyword.

Finally, the CPU registers the main part of the image file data in the image file data part (coded data) 850 of the optical disk 212. Namely, the CPU 201 starts the image processor 211, compresses the image file data stored in the image memory 205, and converts it to coded data 852 (Step 414). For conversion to the coded data, for example, the MH (Modified Huffman) or MMR (Modified Modified READ) method may be used. The coded image file data 852 is registered in the image file data part 850 of the optical disk 212 (Step 415). Thereafter, the CPU 201 increments the number of registered documents which is written in the main memory 202 by 1 (Step 416). By repeating a series of registration operations whenever image file data is input, a large amount of images are stored on the optical disk 12.

Next, the retrieval processing will be explained.

Also in the retrieval processing, the two retrieval modes using symbols and keywords are switched and executed according to the number of documents.

Firstly, to decide the retrieval method, the number of documents stored on the optical disk 212 is decided. Namely, the CPU 201 reads the number of registered documents which is written in the main memory 202 beforehand (Step 501) and compares it with the predetermined reference number of documents θ (Step 502). When the number of documents is smaller than the reference number of documents θ, the CPU goes to Steps 503 to 507 which will be described later and executes the retrieval using symbols. When the number of documents is larger than the reference number of documents θ, the CPU goes to Steps 508 to 511 which will be described later and executes the retrieval using keywords.

For retrieval using symbols, the CPU 201 reads the symbols registered in the main memory 202 and displays them on the display 206 via the display controller 207 (Step 504). The operator designates the desired symbol from the displayed symbols using the mouse 208 by turning the pages on the display screen (Step 504). The information of the designated symbol is stored in the main memory 202 from the mouse 208 via the key/mouse controller 210. The CPU 201 decodes the corresponding symbol ID from the symbol information stored in the main memory 202 (Step 505). Next, the CPU 201 starts the optical disk controller 213. The started optical disk controller 213 reads the contents of all of the documents (image files) in the index part 800 from the optical disk 212. The read information (index part 800) is stored in the image memory 205 and is checked as to whether it matches the selected symbol IDs. Only the information of the document files (image file data) having all of the selected symbol IDs is left and the information of other documents is erased from the image memory 205 (Step 507). Finally, the CPU 201 refers to the pointer indicating the storing address of the image file data corresponding to the input ID and stores it in the main memory 202. Thereafter, the CPU 201 goes to Step 512.

On the other hand, in the keyword retrieval processing, the CPU displays the keyword input column (Step 508) and the operator inputs the keyword from the keyboard 209 (Step 509, see the keyword retrieval sequence (2) shown in FIG. 7). Next, the CPU 201 starts the optical disk controller 213 and reads the contents of all the documents (image files) in the index part 800 from the optical disk 212 (Step 510). The read index part 800 is stored in the image memory 205 and is checked as to whether it matches the input keywords. Only the information of the document files (image file data) having all of the input keywords is left and the information of other documents is erased from the image memory 205 (Step 511). Finally, the CPU 201 refers to the pointer indicating the storing address of the image file data corresponding to the input keyword and stores it in the main memory 202. Thereafter, the CPU 201 goes to Step 512.

At Step 512, the pointer stored in the main memory 202 is reported to the optical disk controller 213 via the CPU 201. The optical disk controller 213 reads the coded data stored at the storing address indicated in the pointer from the optical disk 212 and stores it in the image memory 205 (Step 512). The stored coded data 852 is decoded and returned by the image processor 211 and converted to the original image file data (Step 513). Finally, the decoded image file data is displayed on the display 206 via the display controller 207 (Step 514).

The above operation is repeated until the desired image file data is obtained. When the desired image file data is obtained on the display 206, the printer controller 215 is started whenever necessary and the image file data is printed on a sheet of paper by the printer 214.

Figure 6:
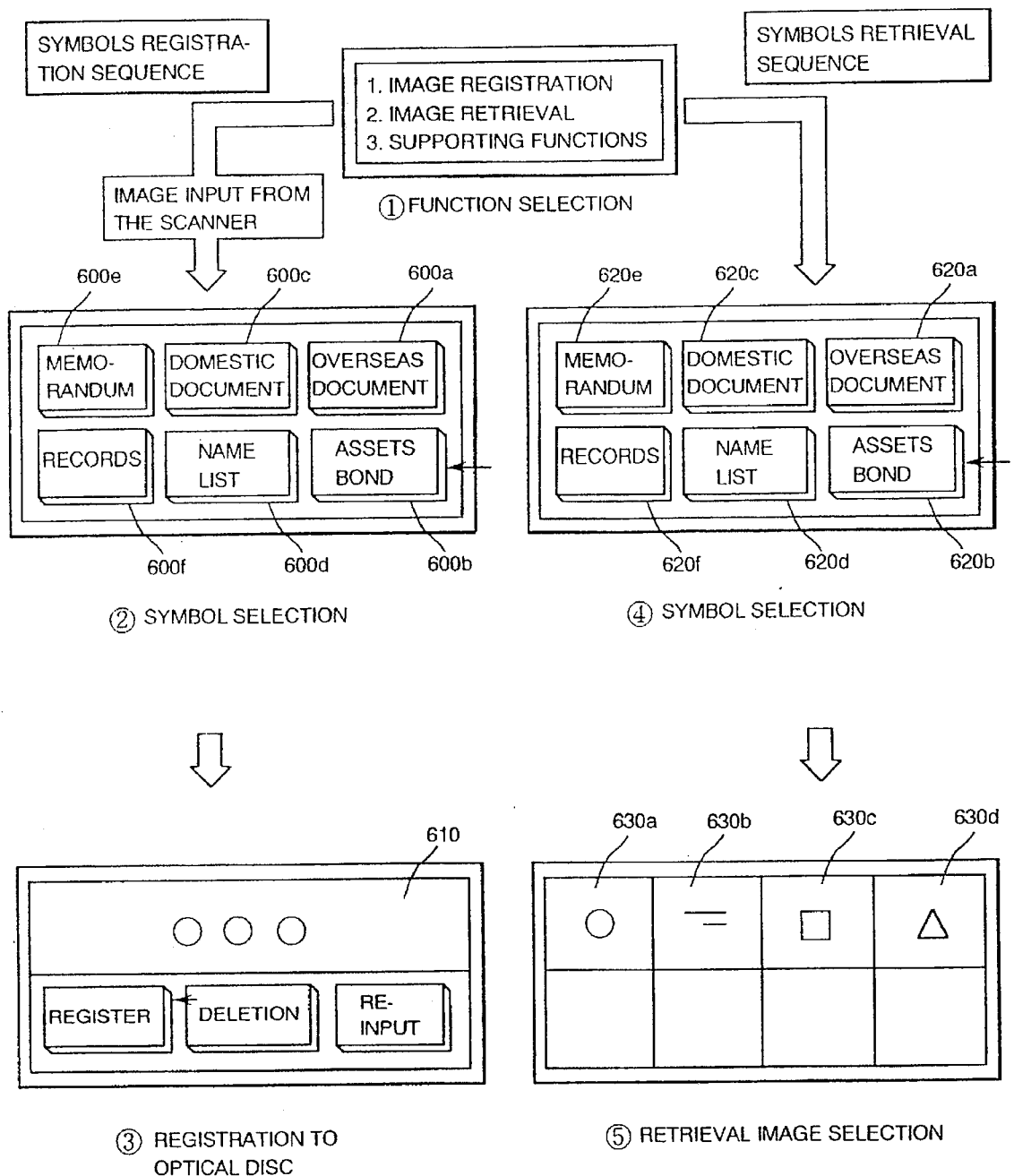
FIG. 6 is a drawing showing the status of changes in screen display when a symbol is registered and retrieved when few documents are registered.

Next, the aforementioned registration and retrieval processing will be explained more in detail with reference to actual display screens (FIGS. 6 and 7).

Firstly, the operation when the number of documents stored on the optical disk 212 is less than the reference number of documents θ will be explained.

The initial screen which is used to select various functions is displayed (1) shown in FIG. 6). The user selects the desired function from the screen.

For registration, "1. Image Registration" is selected. When "Image Registration" is selected, a document image is input. In this embodiment, a document is input by the scanner 203 with an automatic paper feed mechanism. It may be input by setting it sheet by sheet.

Since it is assumed that here are few documents in this case, the registration processing using symbols is performed. Namely, various symbols 600a to 600f are displayed on the screen (2) shown in FIG. 6). In (2) shown in FIG. 6, symbols including character images such as "Memorandum" and "Records" are displayed. Therefore, the symbol which is to be assigned to the input document (image) is designated. When the desired symbol cannot be detected, the pages are turned. Then, a screen 610 which is input from the scanner and the screen on which the subsequent processing is to be selected are displayed. Therefore, to register the document on the optical disk 212 as it is, an icon of "Registration" is selected by the mouse (3) shown in FIG. 6). When it is not to be registered, "Deletion" is selected. When an error is found in the document image 610 and the image is to be input once again, an icon of "Re-input" is selected.

For retrieval, "2. Image Retrieval" is selected on the initial screen (1) shown in FIG. 6). Then, the screen is updated and a symbol selection screen is displayed (4) shown in FIG. 6). The symbol assigned to the document image to be retrieved is selected from symbols 620a to 620f displayed on this screen by the mouse. When the file to be retrieved is not displayed on the screen, the screen is updated sequentially (pages are turned) so as to find the desired symbol. When the symbol selection is finished and retrieval start is instructed, the document image assigned with the selected symbol is searched for a detected document image 630 is displayed (5) shown in FIG. 6). When a plurality of document images 630a to 630d are displayed as shown in (5) in FIG. 6, only one image can be left finally by designating the desired document image among them by the mouse. Thereafter, it is printed by the printer whenever necessary.

Next, the operation when the number of documents stored on the optical disk 212 is more than the reference number of documents θ will be explained.

The initial screen which is used to select various functions is displayed (1) shown in FIG. 7). The user selects the desired function from the screen.

For registration, "1. Image Registration" is selected. Since it is assumed that there are many documents in this case, the registration processing using keywords is performed. Namely, a keyword input screen 700 is displayed (2) shown in FIG. 7). The user inputs the keyword in the input column of each item. In the example shown in FIG. 7, "Yamamoto Sumio" is input in the item of full name, "668714" in the item of number, "1st section of development department" in the item of staff member, and "Business year 62 of Showa" in the item of entrance date. In a column where the content of item is not specifically designated, the user can input a necessary keyword.

When the keywords are input, a screen 710 which is input from the scanner and the screen on which the subsequent processing is to be selected are displayed. Therefore, to register the document on the optical disk 212 as it is, an icon of "Registration" is selected by the mouse ([3] shown in FIG. 7). When it is not to be registered, "Deletion" is selected. When an error is found in the document image 710 and the image is to be input once again, an icon of "Re-input" is selected.

For retrieval, "2. Image Retrieval" is selected on the initial screen (1) shown in FIG. 7). Then, the screen is updated and a keyword input screen 720 is displayed (1) shown in FIG. 7). The keyword assigned to the document to be retrieved is input from the keyboard. In the example shown in (4) in FIG. 7, "1st section of development department" is input in the item of staff member and "Business year 62 of Showa" in the item of entrance date. When the keyword selection is finished and retrieval start is instructed, the document image assigned with the input keyword is searched for a detected document image 730 is displayed (5) shown in FIG. 7). When a plurality of document images 730a to 730d are displayed as shown in (5) in FIG. 7, only one image can be left finally by designating the desired document image among them by the mouse. Thereafter, it is printed by the printer whenever necessary.

According to the above description, the registration—retrieval method is switched according to the number of registered documents each time. According to the present invention, needless to say, when the method is switched once, there is no need to return it to the original one even if the number of documents is decreased.

In the above embodiment, for registration using symbols, the symbol IDs and symbol keywords are automatically written into the index part 800. However, when the registration—retrieval method is changed (namely, when the number of documents becomes more than the reference number of documents θ), symbol keywords may be assigned to all of the document images at one time. The apparatus may be structured so as to automatically assign the image size and registration date in addition to the symbol ID and keyword.

Furthermore, in the keyword registration—retrieval method, a keyword may be added or changed freely for a registered document.

As explained above, according to this embodiment the number of keying may be minimized for registration or retrieval of document images by using symbols and keywords appropriately. Namely, the man-machine interface of an image filing device can be improved substantially.

According to the above embodiment, the registration or retrieval method is switched according to the number of documents. However, each method may be selected according to the number of symbols which is set in the entire system. The reason is that when the number of symbols which is set in the entire system increases, the time required to search for the desired symbol for registration or retrieval increases. In this case, the reference number of symbols is prepared in the selector 4 in place of the reference number of documents mentioned above. A symbol detector for detecting the number of symbols is prepared in place of the document number detector 3.

It is desirable that the reference number of documents mentioned above can be changed. The reason is that the symbol display speed varies with the hardware type to be used. Namely, when the apparatus is used for a system in which the display processing speed is slow, the above reference number of documents is decreased. When the apparatus is used for a system in which the display processing speed is fast, the above reference number of documents is increased.

In the aforementioned embodiment, an image registering device is used. Needless to say, the present invention is not limited to it. The present invention can be used widely in devices for registering and retrieving data.

As mentioned above, according to the present invention, documents can be registered and retrieved easily regardless of the number of registered documents. Therefore, the man-machine interface of a filing device can be improved substantially.

We claim:

1. A data file apparatus comprising:

data file input means for inputting data files;

data file storage means for storing data files inputted by said data input means by assigning attribute information to each of the data files, said attribute information being a clue for retrieving information;

symbol based retrieving means for retrieving at least one of said data files based upon a symbolic image as said attribute information, said symbolic image being displayed by said display means;

keyword based retrieving means for retrieving at least one of said data files based upon at least one keyword; and selecting means for switching between the symbol based retrieving means and the keyword based retrieving means based on a number of data files stored in said storage means so that said symbol based retrieving means is selected when the number of said data files stored in said storage means is less than a predetermined value and said keyword based retrieving means is selected when the number of data files stored in said storage means is greater than the predetermined value; and means for changing the symbolic image attribute information to the corresponding keyword when a number of stored data files is greater than a predetermined value.

2. A data file apparatus according to claim 1, wherein said status of said data files includes the number of data files stored in said storage means.

3. A data file apparatus according to claim 1, wherein said status of said data files includes the number of symbolic images of said data files stored in said storage means.

4. A data file apparatus according to claim 1, wherein said keyword based retrieving means comprises a CPU.

5. A data file apparatus according to claim 1, wherein said data file storage means includes optical disk means.

6. A data file apparatus according to claim 1, further comprising mouse means for designating said symbolic image.

7. A data file apparatus according to claim 1, wherein said symbolic image includes an icon.

8. A data file apparatus, comprising:

data file input means for inputting data files;

data file storage means for storing data files inputted by said data input means by assigning attribute information to each of the data files, said attribute information being a clue for retrieving each of said data files;

display means for displaying said attribute information;

symbol based retrieving means for retrieving at least one of said data files based upon a symbolic image as said attribute information, said symbolic image being displayed by said display means;

keyword based retrieving means for retrieving at least one of said data files based upon at least one keyword; and selecting means for switching between said symbol based retrieving means and said keyword based retrieving means based on a number of data files stored in said storage means so that said symbol based retrieving means is selected when the number of said data files stored in said storage means is less than a predetermined value and said keyword based retrieving means is selected when the number of said data files stored in said storage means is greater than the predetermined value.

9. A data file apparatus according to claim 8, wherein in said attribute information assignment image data file retrieval means, said image data file status includes the number of data files stored in said storage means.

10. A data file apparatus according to claim 8, wherein said status of data files includes the number of symbolic images of said data files stored in said storage means.

11. A data file apparatus according to claim 8, wherein said keyword based retrieving means comprises a CPU.

12. A data file apparatus according to claim 8, wherein said data file storage means includes optical disk means.

13. A data file apparatus according to claim 8, further comprising mouse means for designating said symbolic image.

* * * * *